United States Patent
Forien et al.

(10) Patent No.: US 11,867,638 B2
(45) Date of Patent: Jan. 9, 2024

(54) SYSTEM AND METHOD FOR IN SITU INSPECTION OF DEFECTS IN ADDITIVELY MANUFACTURED PARTS USING HIGH SPEED MELT POOL PYROMETRY

(71) Applicant: Lawrence Livermore National Security, LLC, Livermore, CA (US)

(72) Inventors: Jean-Baptiste Forien, Livermore, CA (US); Nicholas P. Calta, San Jose, CA (US); Gabriel Mark Guss, Manteca, CA (US); Manyalibo Joseph Matthews, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 9 days.

(21) Appl. No.: 17/082,855

(22) Filed: Oct. 28, 2020

(65) Prior Publication Data

US 2022/0128483 A1    Apr. 28, 2022

(51) Int. Cl.
*G01N 21/88*    (2006.01)
*G01N 21/95*    (2006.01)
(Continued)

(52) U.S. Cl.
CPC ......... *G01N 21/8806* (2013.01); *B22F 10/80* (2021.01); *B29C 64/386* (2017.08);
(Continued)

(58) Field of Classification Search
CPC ............ G01N 21/8806; G01N 21/95; G01N 2201/06113; B22F 10/80; B29C 64/386; B33Y 50/00
See application file for complete search history.

(56) References Cited

U.S. PATENT DOCUMENTS

2015/0268099 A1*   9/2015   Craig ................ G01J 5/602
                                                                 374/130
2016/0184893 A1*   6/2016   Dave ................ B22F 10/20
                                                                 419/53
(Continued)

FOREIGN PATENT DOCUMENTS

EP    3659727 A1 *  6/2020
GB    2584820 A  * 12/2020   .............. B22F 10/20
(Continued)

OTHER PUBLICATIONS

S. Watts, W. J. Arrighi, J. Kudo, D.A. Tortorelli, D. A. White, "Simple, accurate surrogate models of the elastic response of three-dimensional open truss micro-architectures with applications to multiscale topology design," Structural and Multidisciplinary Optimization, 60.5 (2019): 122-147.

(Continued)

*Primary Examiner* — Marcus H Taningco
(74) *Attorney, Agent, or Firm* — HARNESS, DICKEY & PIERCE, P.L.C.

(57) ABSTRACT

A system and method is disclosed for detecting anomalies in an additively manufactured part. An energy source generates a signal forming an optical beam for creating a melt pool in a layer of feedstock material being selectively fused to make a part in an additive manufacturing operation. A sensor is configured to receive a signal reflected from the melt pool. The reflected signal forms a thermal signal indicative of a temperature of the feedstock material at a known location on a layer of the feedstock material while the feedstock material (Continued)

is being fused at the known location. A controller receives and analyzes data relating to the received signal to determine if an anomaly exists at the known location.

17 Claims, 3 Drawing Sheets

(51) Int. Cl.
  *B29C 64/386* (2017.01)
  *B22F 10/80* (2021.01)
  *B33Y 50/00* (2015.01)

(52) U.S. Cl.
  CPC .............. *B33Y 50/00* (2014.12); *G01N 21/95* (2013.01); *G01N 2201/06113* (2013.01)

(56) References Cited

U.S. PATENT DOCUMENTS

| | | | |
|---|---|---|---|
| 2017/0239892 A1* | 8/2017 | Buller | B22F 10/30 |
| 2019/0118481 A1* | 4/2019 | Brown | B22F 12/49 |
| 2019/0255654 A1* | 8/2019 | Beckett | B23K 26/34 |
| 2020/0064289 A1* | 2/2020 | Huang | G06V 10/40 |
| 2020/0254565 A1* | 8/2020 | Calta | G01K 11/125 |
| 2021/0162505 A1* | 6/2021 | Narita | B22F 10/368 |
| 2021/0191372 A1* | 6/2021 | Kunkel | G05B 19/41875 |
| 2021/0331271 A1* | 10/2021 | Nauka | G01N 21/8806 |
| 2021/0394272 A1* | 12/2021 | Jones | B22F 10/20 |

FOREIGN PATENT DOCUMENTS

| | | | | |
|---|---|---|---|---|
| KR | 2194694 B1 | * | 12/2020 | ............. B22F 10/00 |
| WO | WO-2017085468 A1 | * | 5/2017 | ............. B22F 10/00 |

OTHER PUBLICATIONS

C. Bonatti, D. Mohr. "Large deformation response of additively-manufactured FCC metamaterials: From octet truss lattices towards continuous shell mesostructures," International Journal of Plasticity, 92 (2017): 122-147.

S. Shevchik et al., "Supervised deep learning for real-time quality monitoring of laser welding with X-ray radiographic guidance," Sci. Rep., vol. 10, No. 1, pp. 1-12, Feb. 2020, doi: 10.1038/s41598-020-60294-x.

S. A. Shevchik, C. Kenel, C. Leinenbach, and K. Wasmer, "Acoustic emission for in situ quality monitoring in additive manufacturing using spectral convolutional neural networks," Additive Manufacturing, vol. 21, pp. 598-604, May 2018, doi: 10.1016/j.addma.2017.11.012.

J.-B. Forien, N. P. Calta, P.J. DePond, G. M. Guss, T. T. Roehling, and M. J. Matthews, "Detecting keyhole pore defects and monitoring process signatures during laser powder bed fusion: A correlation between in situ pyrometry and ex situ X-ray radiography," Additive Manufacturing, 35 (2020), doi: 10.1016/j.addma.2020.101336.

\* cited by examiner

SYSTEM AND METHOD FOR IN SITU INSPECTION OF DEFECTS IN ADDITIVELY MANUFACTURED PARTS USING HIGH SPEED MELT POOL PYROMETRY

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for evaluating additively manufactured parts, in situ, and more particularly to systems and methods for in situ detection of defects in additively manufactured microlattices.

BACKGROUND

The statements in this section merely provide background information related to the present disclosure and may not constitute prior art.

Laser Powder Bed Fusion (LPBF) is an additive manufacturing technology used to produce metal parts with complex geometries. While LPBF-built parts are successfully used in a number of different areas, it is not yet a fully mature technology and still faces obstacles slowing down its widespread adoption.

One particularly significant challenge for complex parts fabricated by LPBF is post-fabrication inspection. This challenge is exacerbated by the complex part geometry achievable with LPBF. The complex part geometry which can be achieved makes quality control with traditional non-destructive techniques such as X-ray computed tomography, acoustic emission monitoring or ultrasonic inspection, especially difficult to perform.

Most commercially available LPBF machines include process monitoring tools for defect detections, which generally use proprietary software for data analysis. This hardware often includes a high-speed pyrometer (or diode) aligned coaxially to the build laser such that the light collected by the pyrometer arises solely from thermal emission of the melt pool. This type of monitoring data is collected in the GE Concept Laser QM meltpool3D® system, the EOSTATE MeltPool system (from EOS North America, Novi, Mich.), the Renishaw InfiniAM monitoring system, and other process monitoring suites. However, the data analysis used to convert raw monitoring signals into actionable process insights varies and does not include any routes for identifying component defects such as missing struts in microlattices.

Another common process monitoring modality includes optical imaging of the entire part to identify anomalies and correlate those anomalies with defects. One prominent example is the "optical tomography" approach used by EOS (the EOSTATE Exposure TO system). Other examples include using whole-layer camera images to identify powder spreading defects in LPBF systems (e.g., Layer Control System, SLM Solutions, Lübeck, Germany; QM Coating, GE—Concept Laser, Lichtenfels, Germany; and Powder-Bed, EOSTATE, Krailling, Germany). While this technique provides a reliable way to identify gross defects, the limited spatial resolution makes this technique challenging to use to identify single-strut defects in a microlattice, which are as small as ~150 micron in diameter. Emerging process monitoring modalities include acoustic emission monitoring, but reports of this monitoring approach have been limited to successfully determine welding mode or keyhole porosity rather than macroscopic defects such as the lattice struts of interest with the present disclosure.

Accordingly, new quality control inspection and/or independent process monitoring techniques are needed to ensure that parts fabricated by LPBF meet quality requirements and can be certified for use.

SUMMARY

This section provides a general summary of the disclosure, and is not a comprehensive disclosure of its full scope or all of its features.

In one aspect the present disclosure relates to a system for detecting anomalies in an additively manufactured part. The system may comprise an energy source configured to generate a beam of energy for creating a melt pool in a layer of feedstock material being selectively fused to make a part in an additive manufacturing operation. An optical sensor may be included which is configured to receive a signal reflected from the melt pool. The reflected signal is indicative of a thermal emission of the feedstock material at a known location on a layer of the feedstock material while the feedstock material is being fused at the known location. A controller may be included which is responsive to the optical sensor and configured to receive and analyze data relating to the received signal to determine if an anomaly exists at the known location.

In another aspect the present disclosure relates to a system for detecting defects in an additively manufactured part. The system may comprise a laser configured to generate a laser beam for creating a melt pool in a layer of feedstock material being selectively fused to make a part in an additive manufacturing operation. A pyrometer may be included which is configured to receive a pyrometry signal reflected from the melt pool. The pyrometry signal forms a thermal signal indicative of a temperature of the feedstock material at a known location on a layer of the feedstock material while the feedstock material is being fused at the known location. A dichroic mirror may be configured to pass the laser beam through without modification, and to redirect the reflected pyrometry signal from a path coaxial with the laser beam to a path non-parallel to the laser beam. A controller responsive to the pyrometer and configured to receive and analyze pyrometry data relating to the pyrometry signal, in situ while the part is being formed, to determine if the defect exists at the known location.

In still another aspect the present disclosure relates to a method for detecting anomalies in an additively manufactured part. The method comprises generating an optical beam for creating a melt pool in a layer of feedstock material being selectively fused to make a part in an additive manufacturing operation. The method further includes detecting a thermal signal reflected from the melt pool. The thermal signal forms a real time indication of a temperature of the feedstock material at a known location on a layer of the feedstock material while the feedstock material is being fused at the known location by the optical beam. The method further includes analyzing data relating to the thermal signal to determine if an anomaly exists at the known location.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

FIG. 3 is a graph with data illustrating that average pyrometer signals of given microlattice struts can be used to identify two distinct populations: normal struts, which have a higher magnitude "average" pyrometer signal; and defective struts, which have a lower average pyrometer signal 16a.

DETAILED DESCRIPTION

Example embodiments will now be described more fully with reference to the accompanying drawings.

The present disclosure uses pyrometry, a technique based on thermal emitted radiation, to identify a specific defect: missing or broken struts in an additively manufactured microlattice. Identification of such missing struts is highly important for understanding and predicting part performance for additively manufactured microlattices.

Previous work on this topic by the co-inventors has shown that pyrometry signals can be correlated with keyhole pore defects and can detect conductive to keyhole transition in single layer AM builds. The present disclosure builds on those results to provide systems and methods that are able to quantify and predict missing lattice struts based on in situ pyrometry data. The systems and methods described herein operate by collecting data using monitoring hardware that is available on most commercial LPBF machines. The systems and methods described herein are therefore universal and independent of the LPBF platform used for part fabrication. The systems and methods of the present disclosure may be used as part of a qualification routine for complex microlattice parts fabricated by LPBF, which are very difficult to inspect with traditional techniques.

The present disclosure is focused on using single color pyrometer data to identify defective or missing struts in an additively manufactured microlattice. In one embodiment the present disclosure uses a pyrometer that is co-axially mounted with the laser path. The pyrometer thus collects a thermal emission signal from a small area, typically only a few hundred microns in diameter, including a melt-pool and nearby material. This fast acquisition rate and small focal area are important features of the present disclosure because they enable the systems and methods described herein to resolve behavior on lengths and timescales necessary to capture the scale of defects present in microlattice parts. The collected pyrometry signal need not be calibrated to an accurate radiant temperature value for the method disclosed here—simple radiant intensity is an adequate metric.

Figure 1:
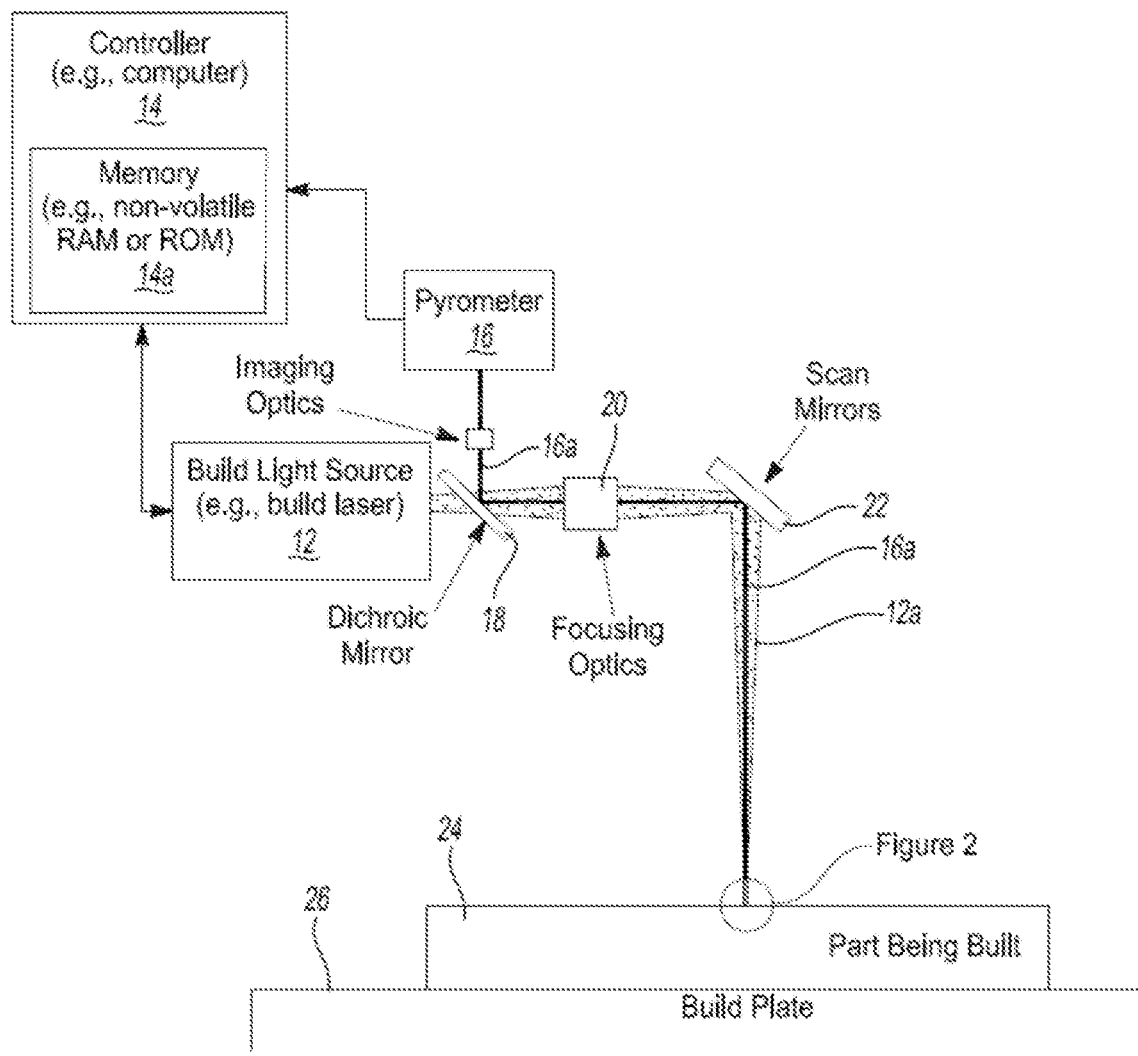
FIG. 1 is a high level block diagram of one embodiment of the present disclosure for detecting a pyrometry signal coaxially with a build laser using a dichroic mirror and a pyrometer.

A system 10 in accordance with one embodiment of the present disclosure is shown in FIG. 1. The system in this example makes use of a build light source 12, which in one embodiment may be a laser, and which will be referred to throughout the following discussion as "laser 12." The laser 12 may be controlled by an electronic controller 14 (e.g., computer). The system may further include a pyrometer 16, a dichroic mirror 18, focusing optics 20 and one or more scan mirrors 22. The controller 14 may also include an integrated, non-volatile memory 14a for storing pyrometer data collected from the pyrometer 16 while a build is occurring. The memory 14a may optionally be an independent component in communication with the controller 14. The pyrometer is commercially available from a number of sources, but one specific pyrometer suitable for use with the system 10 is available from Kleiber KGA 740LO, Kleiber Infrared GmbH, Unterwellenborn, Germany.

The build laser 12 generates a laser beam 12a which passes through the dichroic mirror 18, is further focused by the focusing optics 20, and then directed by the scan mirrors 22 onto a surface of material (typically powdered or granular feedstock) being used to form part 24 being built. The part is built on a build plate 26 in a layer-by-layer fashion, by depositing a new layer of feedstock material (i.e., powdered or granular material typically including plastic or metal particles). The laser 12 may be a continuous wave laser, although the teachings of the present disclosure are expected to work with a pulsed laser as well. Advantageously, no modifications to the laser itself are required with the system 10.

The dichroic mirror 16 and the scan mirrors 20 enable the pyrometer 16 to receive and monitor a pyrometry (i.e., thermal emission) signal 16a originating from the material being melted to form the part 24. Since the pyrometry signal 16a being received by the pyrometer 16 is collected coaxially with the laser beam 12a, the thermal signal 16a is highly indicative of the real time temperature at the melt pool created by the laser beam 12a while melting the feedstock material to create a portion (e.g., strut) of the part 24. This coaxial arrangement of transmission paths for the laser beam 12a and the thermal signal 16a also eliminates the need to use a number of different dichroic elements and/or mirror elements dedicated to channeling just the pyrometer signal, and minimizes the possibility of misalignments that could shift the focus of the pyrometer signal away from the melt pool.

Figure 2:
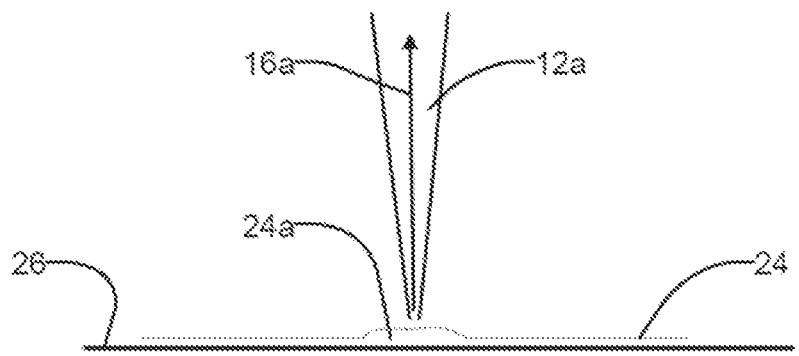
FIG. 2 is a simplified, and highly enlarged, portion of the build plate shown in FIG. 1 showing the melt pool formed on the surface, and the pyrometer signal that is fed back to the pyrometer.

Referring to FIGS. 1 and 2, the pyrometer 16 in one example is a 100 kHz infrared pyrometer. The pyrometer 16 receives the pyrometry (i.e., thermal emission) signal 16a generated from a melt pool 24a being used to form a layer of the part 24 on the build plate 22, as shown in FIG. 2. The controller 14 of the system 10 uses the average intensity (i.e., specific real time temperature values) of the melt pool 24a pyrometry signal 16a to make a statistical prediction as to whether the strut is being built as designed or if it is defective. In this context, "average intensity" refers to the mean of the pyrometry signal over a given time period. The time period of interest can vary depending on the size of the strut of interest. When creating struts, a defect will typically appear as a break or disconnect at one or more portions along a length of the strut. This statistical prediction can be made by the controller 14 and then used as a quality metric for a microlattice part. Importantly, these statistical predictions are generated in situ (i.e., in real time) as the strut is being formed. Thus, a plurality of statistical predictions can be made on each layer in an LPBF build, one or more for each individual strut being constructed during the building of the part 24. In one embodiment the statistical predictions may be made, for example, every 1 ms-1.5 ms as the pyrometer data is collected by the controller 14.

To make the above-mentioned predictions, the intensity of the pyrometry signal 16a is recorded and averaged for a given layer and a given strut. This average pyrometry intensity may then be compared to a global average for all the struts over the entire volume of the microlattice part. In instances of the first layer being built over powder, which is the case in a broken strut, the melt pool behavior is distinctly different than normal microstrut building, and these differences cause the pyrometer signal 16a to change. By comparing average pyrometer signals of given microlattice struts, two populations can be identified: normal struts, which have a higher magnitude "average" pyrometer signal 16a; and defective struts, which have a lower average pyrometer signal 16a (the lower average pyrometer signal may vary as a function of individual machine or specific microlattice part geometry and will be known in advance from previously performed testing). In some instances, one may be able to detect from the collected pyrometer data that a strut is highly likely to be defective, even before the building of the part is completed.

Figure 3:
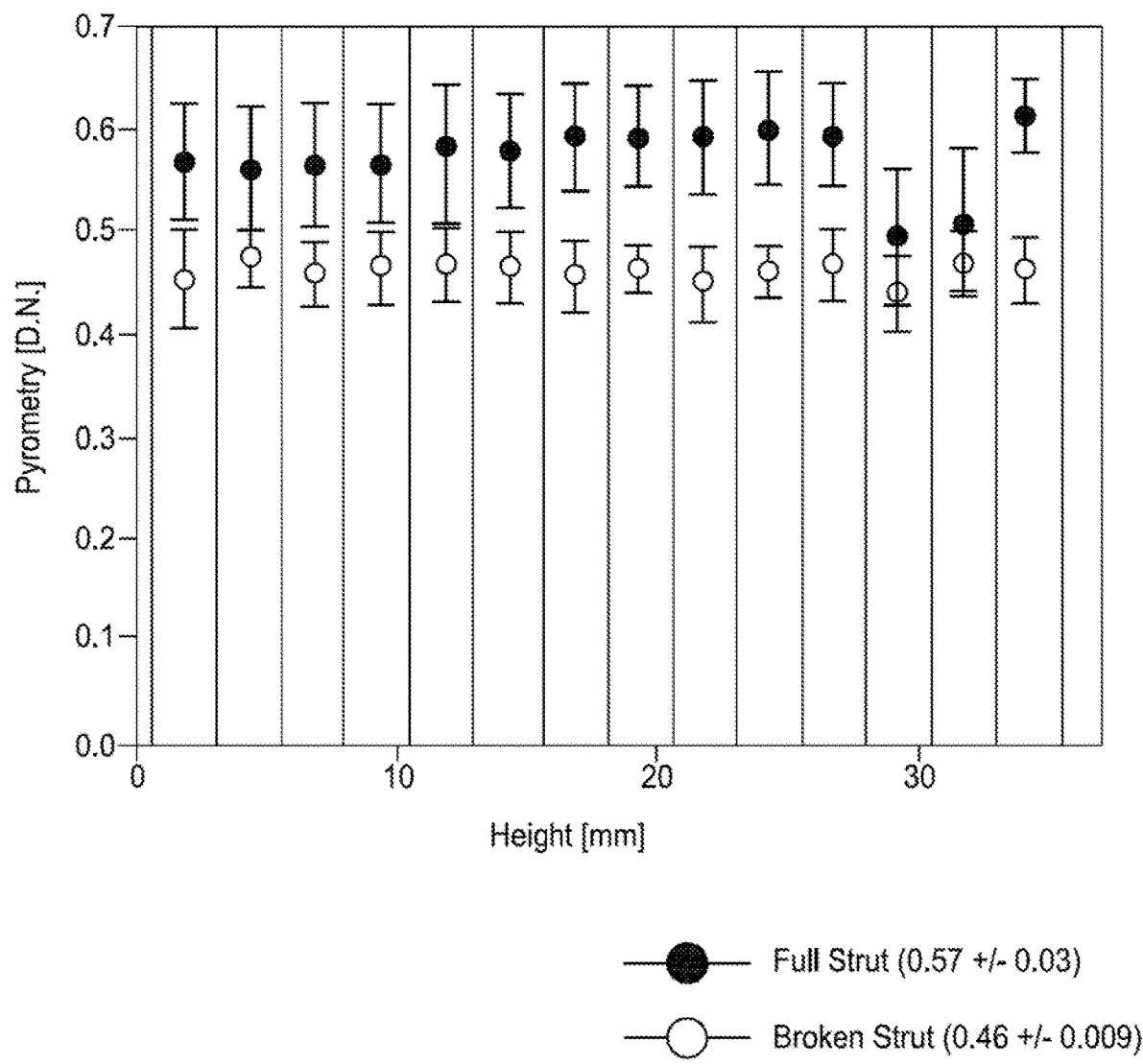

An example of this behavior from a proof of principle experiment is illustrated in FIG. 3. These results can then be used to classify, during building of a part, which struts are normal and which are defective. In FIG. 3, one can see distinct differences when comparing the pyrometry signal 16a collected in response to building intentionally broken struts to the pyrometry signal collected which corresponding to normal struts, compared as a function of height in the fabricated part. Near 30 mm, approaching the end of the build process (i.e., the part 24 is almost fully constructed), the broken and full strut signals converge due to a change in the process atmosphere and additional recoating issue. For the rest of the build, the pyrometry signals 16a from the broken strut and full struts are clearly distinguishable, with the pyrometry signals form the broken strut being lesser in magnitude by a clearly discernable amount. The change in pyrometry signal correlated with the change in process atmosphere illustrates the potential utility of the approach described in this disclosure for detecting defective microlattice struts.

Figure 4:
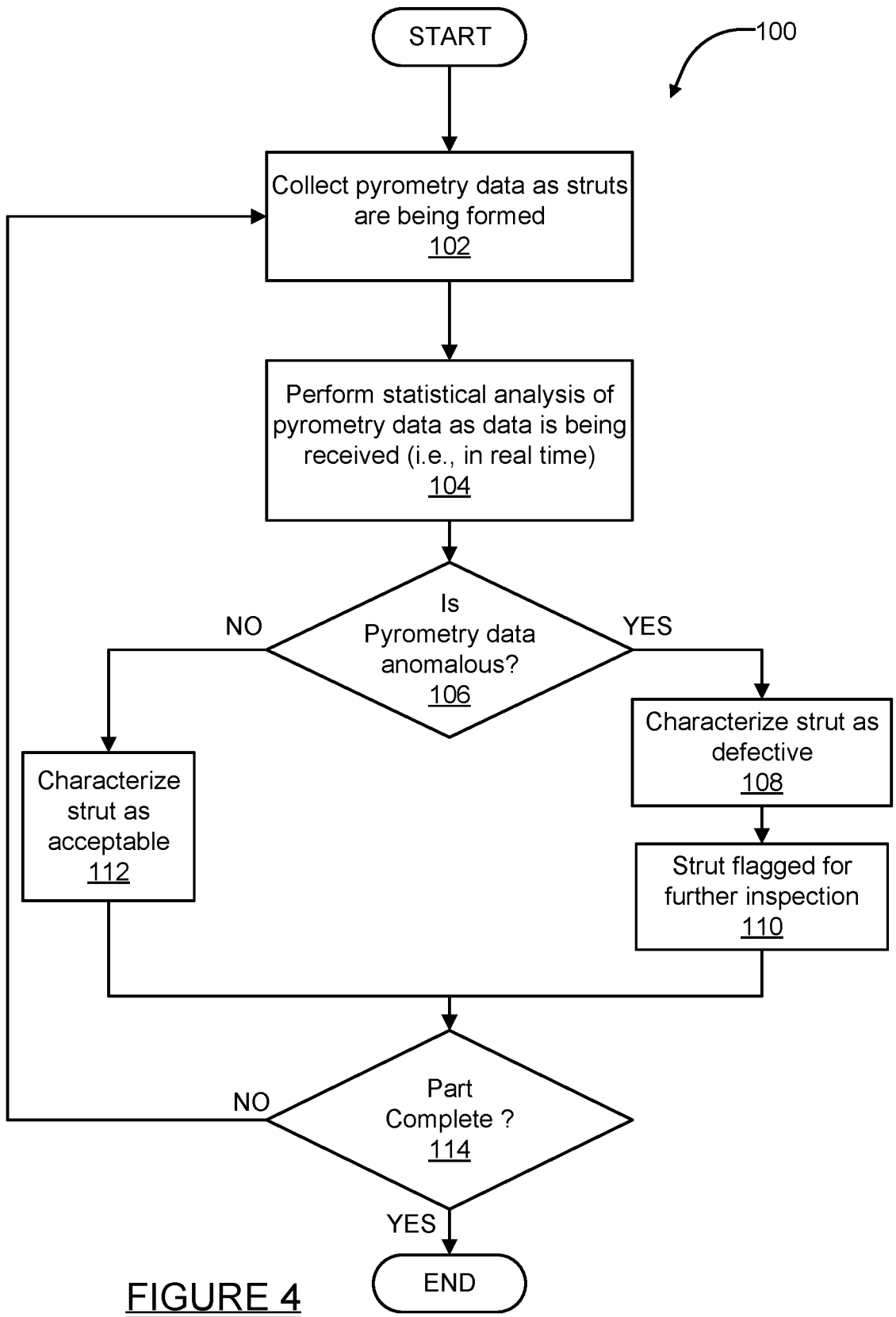
FIG. 4 is a flowchart illustrating major operations that may be performed by the system of FIG. 1 in accordance with a method of the present disclosure to detect, in situ, defects in a part being additively manufactured.

One example of operations that may be performed by the system 10 in carrying out a method of the present disclosure to identify and classify breaks in struts is shown in a flowchart 100 in FIG. 4. At operation 102 the controller 14 may collect pyrometry signals 16a (i.e., pyrometry data) from the pyrometer 16 as the struts of a part are being formed, as indicated at operation 102. At operation 104 the controller 14 may be used to perform a statistical analysis of the pyrometry data as the data is being received (i.e., in real time during building of the part 24). At operation 106 real time determinations may be made by the controller 14 if the pyrometry data being received is anomalous, as indicated at operation 106. For any data received which the controller 14 determines is anomalous, the controller 14 may characterize the strut as defective, as indicated at operation 108. Optionally, if the anomaly detected is only slight, the controller 14 may flag the strut for further inspection after the build process is complete, as indicated at operation 110. If the check at operation 106 indicates no anomaly in the formation of the strut, then the controller 14 may characterize the strut as acceptable.

A check may then be made at operation 114 if the build process is complete (i.e., all struts have been formed or attempted to be formed). If this check produces a "Yes" answer, the method ends. If the check at operation 114 produces a "No" answer, then operations 102-112 are repeated as the building of the part continues to be carried out.

In addition to the operations described in the flowchart 100, the system and method of the present disclosure may also perform additional operations to even further increase the accuracy in identifying anomalous struts. For example, the system 10 could be used to compare other statistical measures related to the pyrometry signal, both within a single layer and over multiple layers for a given strut. Thus, the system 10 may be used to construct a table showing for each strut, exactly where at each layer of the part a definite anomaly in strut formation has occurred, or where a suspected anomaly may have occurred.

The system 10 and its corresponding method thus provide a valuable means for monitoring/inspecting portions (e.g., struts) of a complex part, through in situ monitoring and analysis of subportions of the part, as the building of the part occurs. In one particularly valuable application, the in situ monitoring of struts of a microlattice can be carried out by the system 10 to identify specific struts of the part being formed which are defective, or which may be defective. The present system 10 and method may be used alone, or as an additional system/method to complement known, post-build inspection routines to even better evaluate the structural quality of parts that would otherwise be difficult to assess and evaluate using previously known techniques and processes. Importantly, the system 10 and method does not interfere with formation of a part or otherwise complicate the build process, or limit the types of materials that may be used to form a given part. The system 10 can also be readily integrated into present day AM systems with little or no modifications required to most present day AM systems. The system 10 and its method of operation provides highly valuable data which is directly related to part quality which are important for process qualification.

And while the system 10 has been described as being particularly valuable in evaluating struts as the struts are being formed, in situ, in a given part by an AM system, it will be appreciated that the system and methods described herein are not limited to the evaluation of only struts. A wide variety of other micro-sized features of a given part (e.g., wall portions) may potentially be evaluated, in situ, using the system 10 and methods described herein with little or no modification to the system and methods.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for detecting anomalies in additively manufactured microlattice parts involving struts, the system comprising:
   an energy source configured to generate a beam of energy for creating a melt pool in a layer of feedstock material being selectively fused to make a part in an additive manufacturing operation;
   an optical sensor configured to receive a thermal emission signal reflected from the melt pool which is indicative of a temperature of the melt pool formed from the feedstock material at a known location on a layer of the feedstock material, while the feedstock material is in a process of being melted and being fused at the known location; and
   a controller responsive to the optical sensor and configured to receive and analyze data relating to an intensity of the received thermal emission signal over a selected period of time, where the selected period of time depends on a size of the strut being created, to determine if an anomaly exists at the known location, the received thermal emission signal relating to obtained temperature values at the known location;
   the controller using the obtained temperature values to generate a statistical prediction if the part is being built as designed or if the part is defective; and
   wherein the received thermal emission signal travels co-axially with the energy beam for at least a portion of a length of travel of the energy beam.

2. The system of claim 1, wherein the energy source comprises a light source and the energy beam comprises a light beam.

3. The system of claim 2, wherein the light source comprises a laser and the light beam comprises a laser beam.

4. The system of claim 1, wherein optical sensor comprises a pyrometer, and the received thermal emission signal comprises a pyrometry signal representing pyrometry data.

5. The system of claim 4, wherein the controller receives the pyrometer data as the part is being formed, and is configured to make the statistical prediction, in situ, if the anomaly occurs.

6. The system of claim 1, wherein the energy beam comprises an optical beam.

7. The system of claim 6, further comprising a dichroic mirror configured to:
   pass the optical beam through in a first direction; and
   to reflect the received thermal emission signal from a path co-axial with travel of the optical beam, while the received signal is travelling in a second direction orthogonal to the first direction.

8. The system of claim 7, further comprising focusing optics for focusing the optical beam.

9. The system of claim 8, further comprising at least one scan mirror for turning the optical beam and the received thermal emission signal.

10. The system of claim 1, wherein the energy source, the optical sensor and the controller are further configured to operate as a laser powder bed fusion additive manufacturing operation.

11. A system for detecting defects in additively manufactured microlattice parts involving struts, the system comprising:
    a laser configured to generate a laser beam for creating a melt pool in a layer of feedstock material being selectively fused to make a part in an additive manufacturing operation;

a pyrometer configured to receive a pyrometry signal reflected from the melt pool along a path co-axial with the laser beam, the pyrometry signal forming a thermal signal indicative of a temperature of the feedstock material at a known location on a layer of the feedstock material, while the feedstock material is in a condition forming the melt pool and being fused at the known location;

a dichroic mirror configured to pass the laser beam through without modification, and to redirect the pyrometry signal from the path coaxial with the laser beam to a path non-parallel to the laser beam; and a controller responsive to the pyrometer and configured to receive and analyze pyrometry data relating to an intensity of the pyrometry signal over a selected time period, the selected time period being dependent on a size of the strut being created, and the controller further configured to use the pyrometry data to make a statistical prediction, in situ while the part is being formed, to determine if a defect exists at the known location.

12. The system of claim 11, further comprising at least one scan mirror configured to:
control a path of the laser beam such that the laser beam is focused at the known location on the layer of feedstock material; and
reflect the pyrometry signal from the known location back to the pyrometer.

13. The system of claim 11, wherein the laser beam and the pyrometry signal travel along parallel opposite paths for at least a portion of travel of the laser beam.

14. The system of claim 11, further comprising focusing optics for helping to focus the laser beam.

15. The system of claim 11, wherein the laser comprises at least one of a pulse laser and a continuous wave laser.

16. A method for detecting anomalies in additively manufactured microlattice parts involving struts, the method comprising:
generating an optical beam along an axis for creating a melt pool in a layer of feedstock material being selectively fused to make a part in an additive manufacturing operation;
detecting a thermal signal reflected from the melt pool back coaxially along the axis, the thermal signal forming a real time indication of a temperature of the feedstock material at a known location on a layer of the feedstock material while the feedstock material is forming the melt pool and being fused at the known location by the optical beam;
determining an average intensity of the thermal signal over a selected time period, the selected time period depending on a size of a strut being created; and
using the average intensity to determine make a statistical prediction, in situ while the melt pool is being formed, if an anomaly exists at the known location.

17. The method of claim 16, wherein:
the thermal signal comprises a thermal signal generated by a pyrometer;
the pyrometer generates data relating to the thermal signal;
the data is fed back to a controller; and
the controller evaluates the data to make the statistical prediction, in real time, and in situ while the part is being formed, if the anomaly exists at the known location.

\* \* \* \* \*